A. E. & W. E. FEROE
Process and Apparatus for Fining Fermented Liquors.
No. 215,338.  Patented May 13, 1879.
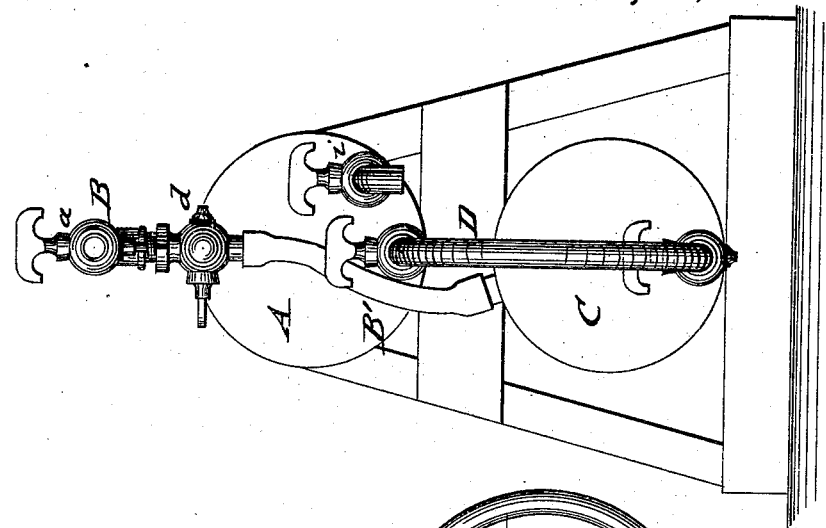
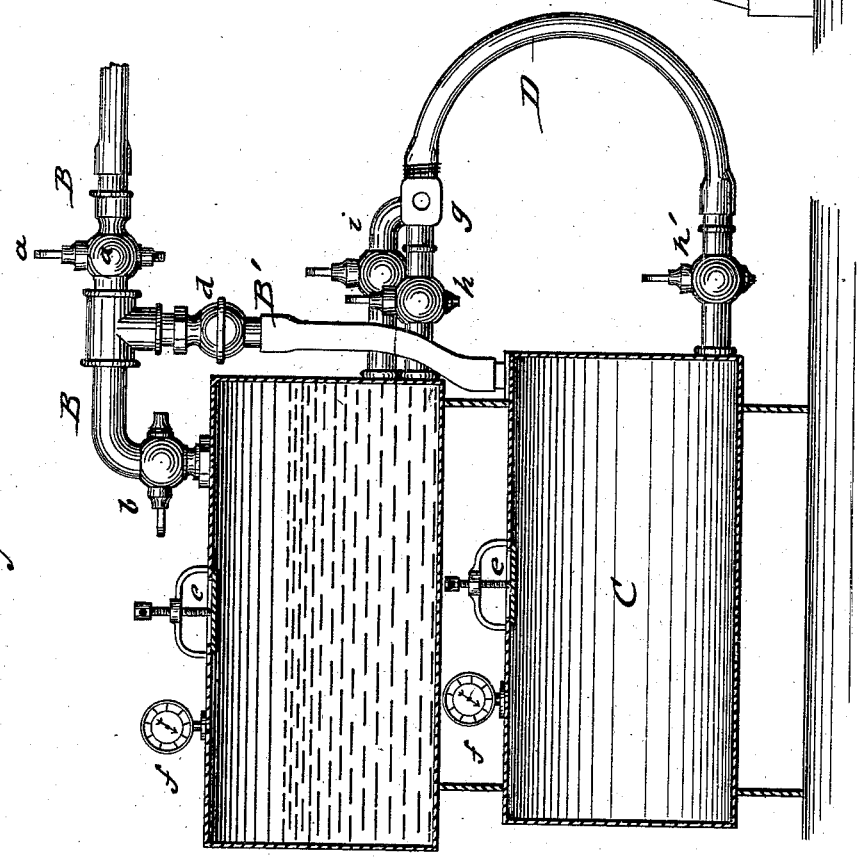
WITNESSES:
Achilles Schehl
C. Sedgwick
INVENTOR:
A. E. Feroe
W. E. Feroe
BY Munn & Co
ATTORNEYS.

UNITED STATES PATENT OFFICE.

ALFRED E. FEROE AND WILLIAM E. FEROE, OF MADALIN, NEW YORK.

IMPROVEMENT IN PROCESSES AND APPARATUS FOR FINING FERMENTED LIQUORS.

Specification forming part of Letters Patent No. 215,338, dated May 13, 1879; application filed August 26, 1878.

*To all whom it may concern:*

Be it known that we, ALFRED E. FEROE and WILLIAM E. FEROE, of Madalin, in the county of Dutchess and State of New York, have invented a new and Improved Apparatus and Process for Fining Fermented Liquors, of which the following is a specification.

In the accompanying drawings, Figure 1 represents a vertical longitudinal section of our improved apparatus for fining fermented liquors, and Fig. 2 is an end elevation of the same.

Similar letters of reference indicate corresponding parts.

This invention has reference to an improved process and apparatus for fining ale, lager-beer, and other fermented liquors in such a manner that the yeast is separated therefrom in a very short time, so as to improve the flavor and the appearance of the liquors, and keep them longer, as yeast is the principal cause of souring.

The fermented liquors may by our method be put into the kegs or bottles free from yeast, so that any fermented liquor can be kept on ice in the same manner as lager-beer, for which latter the process is also of great value, as the beer may be freed of yeast in a few days, while at present it takes from thirty to sixty days, so that there will be a saving in time and labor, and also less storage-room be needed, as there is always but a small stock ahead.

The invention consists of a tank, into which the fermented liquor is filled, and then exposed therein to a considerable pressure by means of air or carbonic-acid gas pumped into the tank.

The air or gas pressure renders the liquor perfectly bright by separating it from the yeast. The liquor is dropped by gravity into a second tank, below the first tank, in which the same pressure has been established as in the upper tank, it being thereby drawn off slowly from the yeast without agitating the liquor and carrying any part of the yeast along. The liquor is then ready to be drawn off into kegs or bottles.

Referring to the drawings, A represents a tank of sheet-iron or wood, and of any suitable size.

The tank A is connected by a rubber hose with a pump that forces either air or carbonic-acid gas into the tank, the hose being applied to a fixed supply-pipe, B, at the top of tank A, said pipe being further connected by a branch pipe, B′, with a second tank, C, that is supported below the level of the first on the same or on a separate frame or stand.

The supply branch pipes B B′ are provided with three valves, $a\ b\ d$, of which the first valve, $a$, serves to shut off the supply of air or gas to either pipe, while the second valve, $b$, near the tank A, closes the pipe B, leading to the tank, and the third valve, $d$, the branch pipe B′, so as to shut off the supply of air or gas to the lower tank. Both tanks are provided with man-holes $e$ and pressure-gages $f$.

The upper tank is also connected by a rubber hose or pipe, D, with the lower tank, the pipe leaving the upper tank near its bottom, and entering the lower tank, also, near the bottom, so as to convey the beer or other fermented liquor from the upper to the lower tank.

The connecting-pipe D is provided with an iron bull's-eye, $g$, having glass windows, through which the beer may be watched on its way from one tank to the other.

The pipe D has stop-valves $h\ h'$ at the upper and lower ends, by which the flow can be regulated and interrupted.

The upper tank has also a small pent-cock, $i$, which serves to draw off samples of the liquor in the upper tank for observing its condition.

To operate the apparatus the beer, ale, or other fermented liquor is filled into the upper tank when it has nearly reached that stage in fermentation when it is usually barreled or put into large casks. The valves $a$ and $b$ of the pipe connecting with the pump are then opened and the remaining valves $d$, $h$, and $h'$ closed. The pump is then worked and air or carbonic-acid gas pumped into the upper tank until the gage indicates a pressure of from forty to eighty pounds. The supply-pipe is then closed and the liquor retained in the tank subject to that pressure from twelve to forty-eight hours until it becomes perfectly bright. The greater the pressure to which the liquor is exposed the clearer will it be, as the pressure of the gas or air on the beer (which is several times greater than the liquor usually has when barreled in the ordinary way) overcomes more thoroughly the tendency of the carbonic-acid gas that is constantly generated in the liquor to rise to the surface and carry the yeast with it. The yeast is thereby retained at the bottom of the tank, and the liquor above obtained in perfectly clear and bright state.

When the liquor has been long enough under pressure, which is ascertained by drawing off a small quantity from the pent-cock, the valve $b$ is closed and the valve $d$ opened, and then air or carbonic acid pumped into the lower tank until the pressure therein equals or slightly exceeds that in the upper tank. Valve $a$ is then closed and valve $b$ opened, which will equalize the pressure in the tanks. The liquor is then dropped from the upper into the lower tank by opening the valves $h$ $h'$ of their connecting-pipe, it passing slowly into the lower tank by the force of gravitation alone, leaving the yeast undisturbed in the bottom of the upper tank.

When the beer is nearly drawn off from the upper tank it must be closely watched through the bull's-eye, so that as soon as it begins to run thick and muddy it can be shut off by closing valve $h'$. By detaching then the connecting-pipe from valve $h'$ the beer can be run out of the lower tank by opening said valve.

The equalization of the pressure in the upper tank, containing the beer, and in the lower tank, into which the same is to be drawn off, causes the separation of the beer from the yeast as it runs off slowly without disturbing the yeast, instead of rushing out and carrying the yeast with it, as it invariably does when drawn from barrel or bottle. The yeast is thereby separated in quicker and more perfect manner, and a brighter, better, and more lasting beer obtained at a considerable saving of time, labor, and storage-room than by the present methods.

Having thus fully described my invention, I claim as new and desire to secure by Letters Patent—

1. An apparatus for fining fermented liquors, consisting of the supply-tank A, receiving-tank C, located one above the other, and valved pipes B B' D, substantially as shown and described.

2. The process of fining malt liquors and removing the same from the sediment, which consists in preventing the rising of the carbonic-acid gas by holding the liquor in closed vessels in which high pressure of air or gas is maintained, whereby the yeast is allowed to settle, then drawing off the clarified liquor into a tank below in which an equal pressure of air or gas is maintained, all as set forth.

3. The combination of an upper tank and of a lower tank with pressure-supplying pipes having stop-valves to shut off either pipe or both, and with a connecting-pipe having stop-valves and intermediate bull's-eye for observing the liquor, substantially as herein shown and described.

ALFRED EMANUEL FEROE.
WILLIAM E. FEROE.

Witnesses:
 WM. S. ROSS,
 F. H. BURNETT.